United States Patent
Li et al.

(10) Patent No.: US 8,960,930 B2
(45) Date of Patent: Feb. 24, 2015

(54) SOLAR SIMULATOR

(75) Inventors: Si-Xian Li, Taoyuan County (TW); Teng-Chun Wu, Kinmen County (TW); Hung-Sen Wu, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 597 days.

(21) Appl. No.: 13/244,282

(22) Filed: Sep. 24, 2011

(65) Prior Publication Data
US 2012/0075829 A1    Mar. 29, 2012

Related U.S. Application Data

(60) Provisional application No. 61/386,582, filed on Sep. 27, 2010.

(51) Int. Cl.
*F21V 7/00*    (2006.01)
*F21V 9/02*    (2006.01)
*H02S 50/10*    (2014.01)

(52) U.S. Cl.
CPC . *F21V 9/02* (2013.01); *H02S 50/10* (2014.12); Y10S 385/90 (2013.01)
USPC .......... 362/1; 362/217.05; 362/557; 359/597; 385/900

(58) Field of Classification Search
CPC ...... F21V 9/02; G02B 27/0977; G02B 27/14; G01N 17/004
USPC .............. 362/1, 217.05, 217.06, 217.07, 231, 362/241, 557; 126/649; 359/591–598; 385/31, 32, 147, 900, 901
See application file for complete search history.

(56) References Cited

U.S. PATENT DOCUMENTS

| | | | |
|---|---|---|---|
| 4,321,910 A * | 3/1982 | Devienne | ...................... 126/649 |
| 4,389,115 A | 6/1983 | Richter | |
| 4,789,989 A | 12/1988 | Stern et al. | |
| 4,933,813 A | 6/1990 | Berger | |
| 4,958,909 A | 9/1990 | Kubo | |
| 5,217,285 A | 6/1993 | Sopori | |
| 5,997,155 A | 12/1999 | Ducharme et al. | |
| 6,061,489 A * | 5/2000 | Ezra et al. | ...................... 385/115 |
| 6,469,834 B1 | 10/2002 | Shahzad et al. | |

(Continued)

FOREIGN PATENT DOCUMENTS

| | | |
|---|---|---|
| CN | 201297565 | 8/2009 |
| DE | 10045028 | 4/2002 |

(Continued)

OTHER PUBLICATIONS

"Office Action of China counterpart application" issued on Dec. 2, 2013, p. 1-p. 7.

(Continued)

*Primary Examiner* — Stephen F Husar
(74) *Attorney, Agent, or Firm* — Jianq Chyun IP Office (57) ABSTRACT

A solar simulator including a light source and a light conduit array is provided. The light source is used for emitting a beam of ray radiation. The light conduit array includes a plurality of light conduits closely adjacent to one another. Each of the light conduits has an inner reflecting surface used for reflecting the ray radiation, a light input side, and a light output side opposite to the light input side. The ray radiation enters the light conduits through the light input side and emitting from the light output side.

15 Claims, 6 Drawing Sheets

(56) References Cited

U.S. PATENT DOCUMENTS

| | | |
|---|---|---|
| 7,425,457 B2 | 9/2008 | Tokutake et al. |
| 2004/0223325 A1 | 11/2004 | Ahrens et al. |
| 2005/0140270 A1 | 6/2005 | Henson et al. |
| 2005/0270791 A1 | 12/2005 | Lee |
| 2007/0086712 A1 | 4/2007 | Shani |
| 2007/0206901 A1 | 9/2007 | Bonitatibus et al. |
| 2008/0225549 A1 | 9/2008 | Dassanayake et al. |
| 2009/0115446 A1 | 5/2009 | Shimotomai |
| 2009/0279277 A1 | 11/2009 | Jungwirth et al. |
| 2010/0014080 A1 | 1/2010 | Jungwirth et al. |
| 2010/0027236 A1 | 2/2010 | Igari |

FOREIGN PATENT DOCUMENTS

| | | |
|---|---|---|
| DE | 202006016879 | 3/2008 |
| JP | 7-98416 A | 4/1995 |
| JP | 2009103535 | 5/2009 |
| JP | 2010-182646 | 8/2010 |
| TW | I322871 | 4/2010 |

OTHER PUBLICATIONS

"Office Action of Germany counterpart application" issued on May 3, 2012, p. 1-p. 5, with English translation thereof on p. 6-p. 10.

Sopori et al., "Design of a Fiber Optic Based Solar Simulator", Photovoltaic Specialists Conference, 1991., Conference Record of the Twenty Second IEEE, Aug. 17, 1991, 783-788.

Giel et al., "Using a fly's eye integrator in efficient illumination engines with multiple light-emitting diode light sources", Optical Engineering, vol. 46(4), Apr. 16, 2007, 043001-1-043001-6.

Wang et al., "Solar simulation technique for solar cell measurement", Optics and Precision Engineering, vol. 17(7), Jul. 16, 2009, 1542-1547.

"Office Action of Japan Counterpart Application", issued on Feb. 26, 2013, p. 1-p. 2.

"Office Action of Taiwan Counterpart Application", issued on Sep. 23, 2013, p. 1-p. 5.

"Office Action of Germany Counterpart Application", issued on Jul. 15, 2014, p. 1-p. 11, with English translation thereof.

\* cited by examiner

SOLAR SIMULATOR

CROSS-REFERENCE TO RELATED APPLICATION

This application claims the priority benefits of U.S. provisional application Ser. No. 61/386,582, filed on Sep. 27, 2010. The entirety of the above-mentioned patent application is hereby incorporated by reference herein and made a part of this specification.

BACKGROUND OF THE INVENTION

1. Field of the Invention

The disclosure relates to an optical system.

2. Description of Related Art

The solar simulator is a major apparatus for inspecting the photoelectric conversion efficiency of the solar cell and the photovoltaic module, which is quite important for the research and the verification of the products in the solar energy industry. The known solar simulator can be divided mainly into a flash type and a continuous exposure type according to the technique of the light source. The flash type solar simulator has the advantage of low cost and simple design. The continuous exposure type solar simulator can provide the exposure similar to the real solar light, so that the measurement error caused by the transient effects can be avoided when the continuous exposure type solar simulator is applied. Furthermore, the continuous exposure type solar simulator can be combined with other testing methods such as heating exposure, measurement exposure, etc. for performing the test in the same apparatus. Hence, the continuous exposure type solar simulator has favorable utility.

The solar simulator is required to have certain performance in at least the three aspects including the spectral match, the non-uniformity of irradiance on the test plane, and the temporal instability of irradiance. The improvement of the non-uniformity of irradiance on the test plane mostly emphasizes on the light distribution design of the light source, the adjusting of the relative position of the light source, and the dispositions of the reflective or scattering elements, which is still difficult for the continuous exposure type solar simulator having a light sources array with large area to achieve the requirement of good uniformity of irradiance on the test plane which can be smaller than 2%.

The continuous exposure type solar simulator with large exposure area generally requires the use of an array of a plurality of lights to obtain the test condition of 1000 W/m² radiation. However, owing that the ray radiation from the plurality of lights can be overlapped and interfered mutually and the scattering light is difficult to be eliminated, the distribution of the ray radiation is complicate and difficult to properly controlled or adjusted by the prior art. In addition, as described in above, the method for controlling the non-uniformity of irradiance on the test plane of the continuous exposure type solar simulator with large exposure area mostly emphasizes on the light distribution design of the light source, the adjusting of the relative position of the light source, the dispositions of the reflective or scattering elements, etc. Such methods of locally adjusting the relative positions of the components may have influence on the light intensity of other regions where the relative positions of the components are not changed, so that the ray radiation distribution of the exposure area must be modulated again, which is time-consuming, difficult to maintain, and failing to efficiently reduce the non-uniformity of irradiance on the test plane. By using the solar simulator to perform the test on the photovoltaic module, the measurement error is not easily to be reduced.

SUMMARY OF THE INVENTION

The disclosure is directed to a solar simulator which can achieve the better uniformity of irradiance on the test plane.

The disclosure is directed to a solar simulator which can achieve the better uniformity of irradiance on the test plane under a plurality of light sources.

The disclosure provides a solar simulator including a light source and a light conduit array. The light source is used for emitting a beam of ray radiation. The light conduit array includes a plurality of light conduits closely adjacent to one another and is configured in a light path of the ray radiation. Each of the light conduits has the inner reflecting surfaces to reflect the ray radiation, a light input side, and a light output side opposite to the light input side. The ray radiation enters the light conduit through the light input side and emitting from the light output side.

The disclosure also provides a solar simulator including a light source array and a light conduit array. The light source array includes a plurality of light sources. Each of the light sources is used for emitting a beam of ray radiation. The light conduit array includes a plurality of light conduits closely adjacent to one another and is configured in a light path of the ray radiation. Each of the light conduits has the inner reflecting surfaces to reflect the ray radiation, a light input side, and a light output side opposite to the light input side. The ray radiation enters the light conduits through the light input side and emitting from the light output side.

In view of the above, a light conduit array consisting of a plurality of light conduits and one or more light source is configured above the light conduit array according to the disclosure. Under the configuration of the light conduit array, the ray radiation emitted from the light source may have the better uniformity of irradiance on the test plane by the effect of the plurality of light conduits. In addition, the solar simulator can be configured with a plurality of light sources for accomplishing even ray radiation of large area exposure.

In order to make the aforementioned and other objects, features and advantages of the present disclosure more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1A:
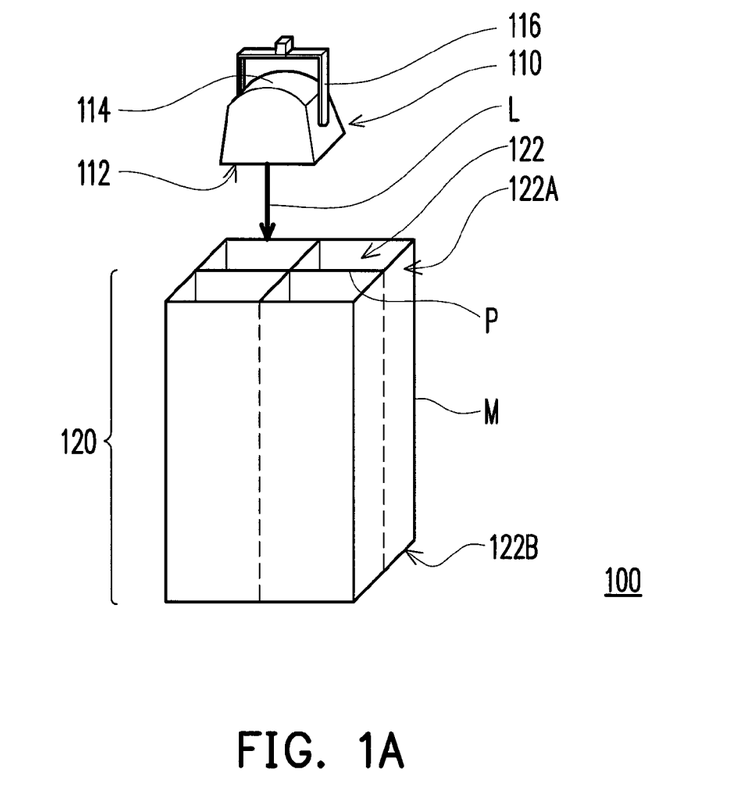
FIG. 1A is a schematic view of a solar simulator according to the first embodiment of the present disclosure.

FIG. 1A is a schematic view of a solar simulator according to the first embodiment of the present disclosure. Referring to FIG. 1A, a solar simulator 100 includes a light source 110 and a light conduit array 120. The light source 110 has a light emitting surface 112 and is used for emitting a beam of ray radiation L. The light conduit array 120 includes a plurality of light conduits 122 closely adjacent to one another and is configured in a light path of the ray radiation L. Each of the light conduits 122 has an inner reflecting surface P reflecting the ray radiation therein, a light input side 122A, and a light output side 122B opposite to the light input side 122A. The ray radiation L enters the light conduits 122 through the light input side 122A and emitting from the light output side 122B so as to provide the required simulated solar light. That is to say, the light input side 122A are relatively closer to the light emitting surface 112 and the light output side 122B are relatively farther from the light emitting surface 112 such that the light emitting surface 112 of the light source 110 faces the light input side 122A of the light conduits 122 according to the present embodiment.

In addition, the light source 110 can include the reflector 114 to collect the ray radiation L to a predetermined light path so that the ray radiation L is transmitted along the predetermined light path. The light conduit array 120, for example, includes four light conduits 122. Each of the light conduits 122 is in the shape of a quadrilateral column, for example. Therefore, the light conduit array 120 can be formed by a stereo frame structure M consisting of a plurality of quadrilateral columns. During fabricating the light conduit array 120, the light conduits 122 each of which is a quadrilateral column constructed by a plurality of reflection inner reflecting surfaces P are assembled or adhered together to formed the light conduit array 120 depicted in FIG. 1A. Alternately, the method of fabricating the light conduit array 120 can include placing a plurality of partition plates in the hollow stereo frame structure M to form the light conduit array 120 having the inner reflecting surfaces P capable of reflecting the ray radiation L. Hence, this embodiment does not restrict the fabricating methods of the light conduit array 120.

Moreover, a material of the stereo frame structure M and the inner reflecting surface P can be reflective material such as aluminum alloy. The stereo frame structure M can be divided into four regions and each of the regions is surrounded by one light conduit 122 according to the present embodiment. The ray radiation L emitted from the light source 110 can be transmitted inside the light conduits 122 and reflected by the inner reflecting surfaces P. Accordingly, under the effect of the light conduit array 120, the ray radiation L can be parceled to a plurality of (e.g. four) exposure regions and the ray radiation L in each exposure region can be reflected again and again so as to have even distribution. In other words, the simulated solar light emitted from each light conduit 122 has the characteristic of even distribution.

Furthermore, the ray radiation L emitted from the light source 110 can be evenly scattered into each of the light conduits 122. Accordingly, the ray radiation L emitted from the light output side 122B of each light conduit 122 can have substantially uniformed intensity. That is to say, the light conduit array 120 not only allows the ray radiation L emitted from one single light conduit 122 to be uniform distribution in the region demarcated by the corresponding light conduit 122, but also allows the ray radiation L emitted from the plurality of light conduits 122 to have consistent intensity, which achieves the better uniformity of irradiance on the test plane and further conduces to reduce the measurement error of the photovoltaic module caused by the non-uniformity of ray radiation.

In the present embodiment, one light source 110 corresponds to the light conduit array 120 consisting of a plurality of the light conduits 122, so that the ray radiation L emitted from the light source 110 can be parceled to a plurality of regions and uniform distribution in each exposure region defined by the light conduit 122. The design of the present embodiment distributing the ray radiation emitted from the light source 110 be parceled to a plurality of the light conduits 122 as well as the design which distributes the ray radiation emitted from the light source transmitted in only one light conduit can achieve the better uniformity of irradiance on the test plane while the light conduits 122 of the present embodiment can have shorter length to conduce to reduce the total volume of the device.

Figure 1B:
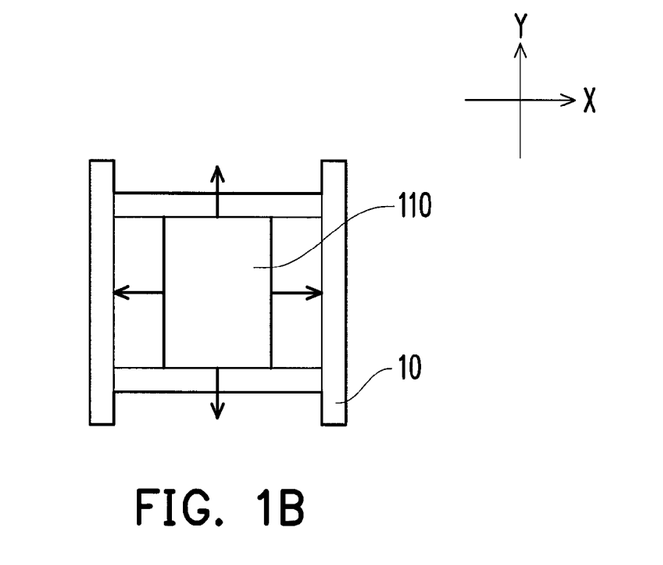
FIG. 1B is a schematic view of the light source and the sliding track.

In specific, the better uniformity of irradiance on the test plane can be accomplished by merely adjusting the relative positions of the light source 110 and the light conduit 120 according to the present embodiment. Accordingly, the light source 110 can further include an alignment device 116 for adjusting the position of the light source 110, wherein the alignment device 116 can be configured on a sliding track 10 as shown in FIG. 1B. The alignment device 116 can slide and move on the sliding track 10 (for example, move along the direction of the arrow) if the position of the light source 110 needs be adjusted. By the adjusting of the alignment device 116, the light source 110 can be located corresponding to the center or other locations of the light conduit array 120. It is noted that the required non-uniformity of irradiance can be obtained by simply adjusting the position of the light source 110 through the alignment device 116 when the non-uniformity of irradiance of the solar simulator 100 does not comply with the requirement.

The light source 110 according to the present embodiment can adopt the light emitting diode (LED) or the high-pressure discharge lamp as the light emitting element, but it is not limited thereto. In addition, the light conduits 122 can be respectively in the shape of a quadrilateral column, for example. Nevertheless, the light conduit 122 illustrated in FIG. 1A though has the shape of a quadrilateral column; the shape of the light conduit 122 can selectively be a hexagonal column, an octagonal column, or other hollow column. More specifically, the included angle between the inner reflecting surfaces P can be 90 degree or other degree not equal to 0 degree based on the requirement of the design.

Figure 2:
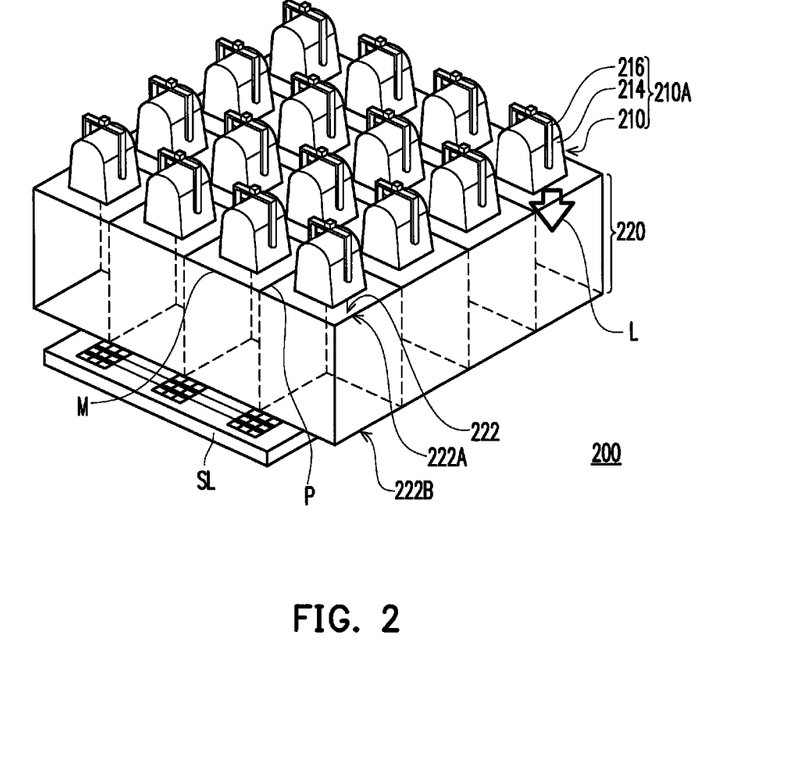
FIG. 2 is a schematic view of a solar simulator according to the second embodiment of the present disclosure.

FIG. 2 is a schematic view of a solar simulator according to the second embodiment of the present disclosure. Referring to FIG. 2, a solar simulator 200 includes a light source array 210A and a light conduit array 220. The light source array 210A includes a plurality of light sources 210. Each of the light sources 210 is used for emitting a beam of ray radiation L from a light emitting surface 212. The light conduit array 220 includes a plurality of light conduits 222 closely adjacent to one another and are configured in a light path of the ray radiation L. Each of the light conduits 222 has an inner reflecting surface P reflecting the ray radiation L, a light input side 222A, and a light output side 222B opposite to the light input side 222A. The ray radiation L emitted from the light sources 210 enters the light conduits 222 through the light input side 222A and emitting from the light output side 222B. The light source 210 can include the reflector 214 to collect the ray radiation L to a predetermined light path. Moreover, the light input side 222A of each light conduit 220 is relatively closer to the light emitting surface 212 of the light source 212 and the light output side 222B thereof is relatively farther from the light emitting surface 212 of the light source 210. Generally, the difference between the present embodiment and the first embodiment mainly lies in that the number of the light sources 210 in the solar simulator 200 according to the present embodiment is a plural and each light source 210 corresponds to one light conduit 222.

The light conduit array 220 constructs, for example, a stereo frame structure M, and the inner reflecting surfaces P defines a plurality of regions inside the stereo frame structure M, wherein the inner reflecting surfaces P and the stereo frame structure M together can form the plurality of the light conduits 222. In the present embodiment, the number of the light conduits 222 can be identical to the number of the light sources 210, for instance. On the other hand, the height of the inner reflecting surfaces P can exemplarily be the same to that of the stereo frame structure M, which is, however, not limited in the present disclosure. Moreover, a material of the stereo frame structure M and the inner reflecting surface P can be reflective material such as aluminum alloy or the like. Accordingly, the ray radiation L emitted from each light source 210 can be transmitted inside one of the light conduits 222 and reflected by the inner reflecting surfaces P again and again for being uniform distribution.

The ray radiation L emitted from each light source 210 emitting from the light output side 222B after passing through the corresponding light conduit 222 in the present embodiment. The ray radiation L emitted from each light source 210 can be reflected by the inner reflecting surfaces P again and again in the corresponding light conduit 222, so that the ray radiation L emitting from each light conduit 222 can have even distribution. The light source 210 according to the present embodiment can adopt the light emitting diode (LED) or the high-pressure discharge lamp as the light emitting element, but the present disclosure is not limited thereto.

Herein, the intensity of the light emitted from the light sources 210 can be controlled to be identical through the selection of the light source, the adjusting of the current applied to the light source, or the like. Therefore, the solar simulator 200 can provide the simulated solar light of large exposure area and even distribution, which can achieve the effect of reducing the measurement error of the photovoltaic module. In addition, the light source 210 can further include the alignment device 216 to adjusting the position of the light source 210, which distributing the ray radiation L uniform distribution inside each light conduit 222.

When the solar simulator 200 is used for inspecting a photovoltaic module SL, the photovoltaic module SL can be placed at the light output side 222B of each of the light conduits 222. Accordingly, the light sources 210 and the photovoltaic module SL to-be inspected can be configured at two opposite sides of the light conduit array 220, wherein the side of the light sources 210 corresponds to the light input side 222A of each light conduit 222 and the side of the photovoltaic module SL corresponds to the light output side 222B of the light conduit 222. Therefore, the photovoltaic module SL can be irradiated by the simulated solar light of large exposure area and even distribution for inspecting the characteristics of the photovoltaic module SL.

Once the non-uniformity distribution of the simulated solar light emitted from the solar simulator 200 according to the present embodiment is detected, the relative positions between the light conduit array 220 and each light source 210 can be changed by merely adjusting the position of the light source 210 through the alignment device for improving the uniformity of irradiance of the simulated solar light. Comparing with the design which adopts an array of a plurality of light sources configured above one conduit, the design of the present embodiment is conducive to improve the overlapping and interferences of the ray radiation between the lights and avoid the adjusting of the ray radiation in single region from influencing the uniformity of irradiance in other regions. Furthermore, the adjusting of the uniformity of irradiance of the ray radiation in the total illumination surface is much simple and time-saving according to the present embodiment.

Figure 3A:
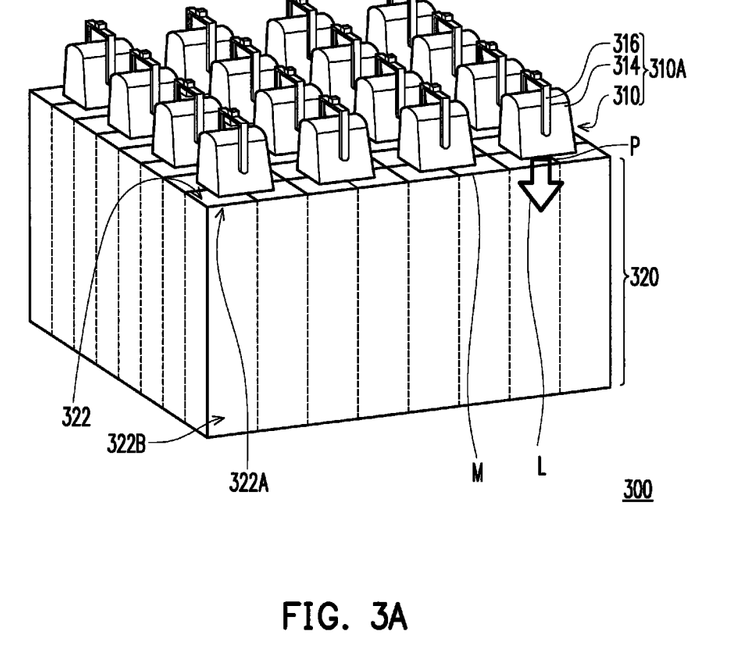
FIG. 3A is a schematic view of a solar simulator according to the third embodiment of the present disclosure.

FIG. 3A is a schematic view of a solar simulator according to the third embodiment of the present disclosure. Referring to FIG. 3A, a solar simulator 300 including a plurality of light sources 310 and a light conduit array 320, wherein each of the light light sources 310 is used for emitting a ray radiation L from the light emitting surface 312 and the light conduit array 320 includes a plurality of light conduits 322. In specific, the light sources 310 construct a light source array 310A, for example. Each of the light conduit 322 configured in the light path of the ray radiation L has an inner reflecting surface P reflecting the ray radiation L, a light input side 322A, and a light output side 322B. The light input side 322A are relatively closer to the light emitting surface 312 and the light output side 322B are relatively farther from the light emitting surface 312 such that the light emitting surface 312 faces the light input side 322A. In the present embodiment, the light source 310 can includes the reflector 314 to collect the ray radiation L to a predetermined light path so that the ray radiation L is transmitted along the predetermined light path. In addition, the ray radiation L enters the light conduits 320 through the light input side 322A and emitting from the light output side 322B so as to provide the required simulated solar light.

Specifically, the difference between the present embodiment and the second embodiment mainly lies in that each of the light sources 310 in the present embodiment corresponds to a plurality of the light conduits 322. Each light source 310 in the present embodiment corresponds, for example, to four light conduits 322 so that the number of the light sources 310 is less than that of the light conduits 322. Furthermore, each light source 310 can be located corresponding to the center of the area defined by four closely adjacent light conduits 322, i.e. the light conduit array 320 parcels out the ray radiation L emitted from each light source 310 to the corresponding four light conduits 322, but it is not intended to limit the disclosure. In addition, each of the light conduits 322 can be respectively in the shape of a polygonal column, for example. In the present embodiment, the light conduits 322 are exemplarily in the shape of a quadrilateral column, for example, but the present disclosure is not limited thereto.

The light conduit array 320 can be formed by a stereo frame structure M consisting of a plurality of light conduits 322. In one embodiment, the light conduit array 320 can be formed by adhering a plurality of independent light conduits 322 to one another. The inner reflecting surfaces P are form by reflective material so that ray radiation L transmitted in each light conduit 322 can be subjected to the reflection of the inner reflecting surfaces P to be uniform distribution and then emit from the light output side 322B. Accordingly, the ray radiation L emitted from each light conduit 322 can have the better uniformity of irradiance on the test plane.

Furthermore, the ray radiation L emitted from each light source 310 can be uniform distribution owing to the effect of the corresponding four light conduits 322, so that the ray radiation L of each light source 310 emitting from the corresponding four light conduits 322 can have the better uniformity of irradiance on the test plane. For the total light emitting effect of the solar simulator 300, the ray radiation L emitted from each light source 310 can achieve the better uniformity of irradiance on the test plane after subjecting to the effect of the light conduit array 320, which can reduce the measurement error of the photovoltaic module caused by the non-uniformity radiation distribution.

Figure 3B:
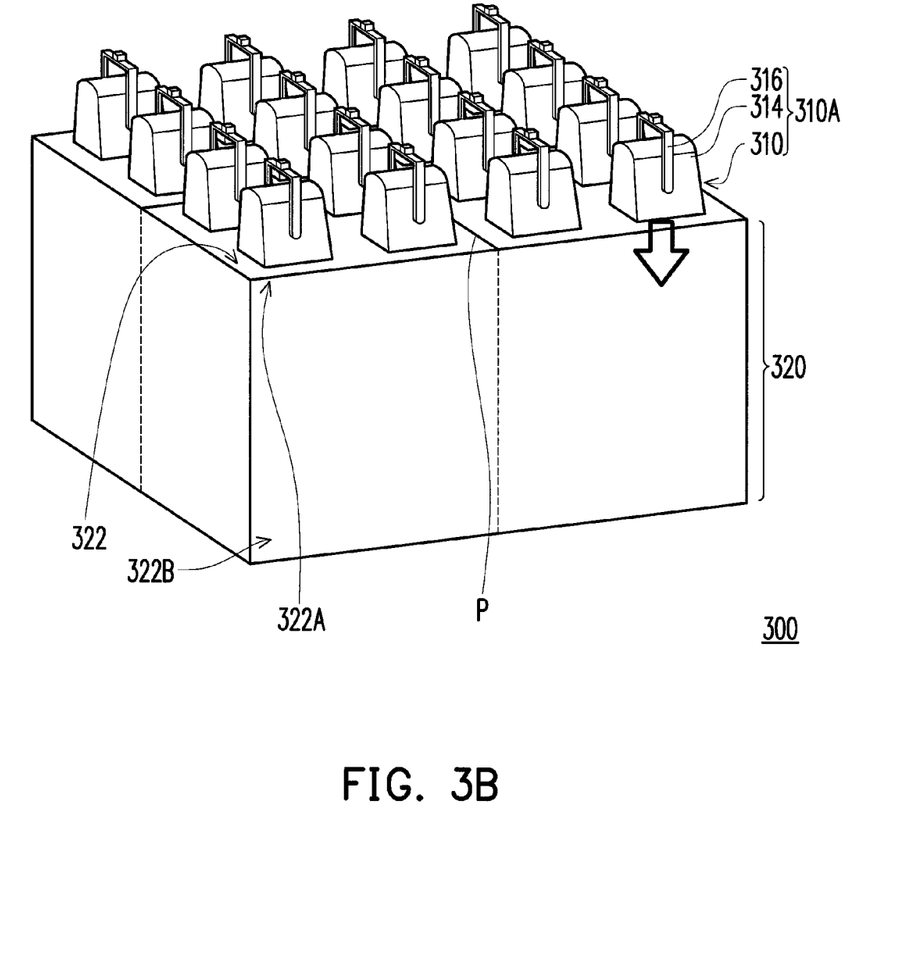
FIG. 3B is a schematic view of another solar simulator according to the third embodiment of the present disclosure.

It should be noted that, the number of the light conduits 322 is larger than or equal to that of the light sources 310 in the above embodiments, however the number of the light conduits 322 can be less than that of the light sources 310 as shown in FIG. 3B according to other embodiments. That is to say, it can be adopted according to the disclosure that a plurality of the light sources 310 corresponds to one light conduit 322.

Figure 4:
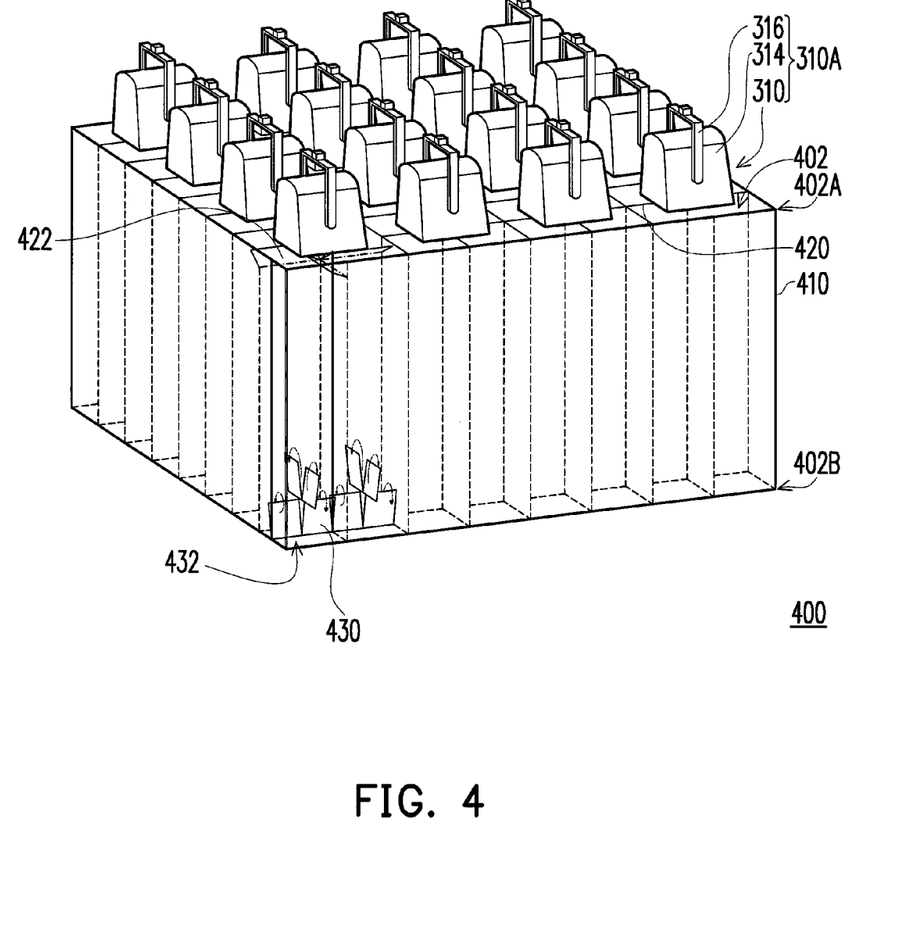
FIG. 4 is a schematic view of a light conduit array of the solar simulator according to an embodiment of the present disclosure.

FIG. 4 is a schematic view of a light conduit array according to an embodiment of the present disclosure. Referring to FIG. 4, the light conduit array 400 is, for example, the stereo frame structure 410 consisting of a plurality of light conduits 402 and each light conduit 402 of the light conduit array 400 has the inner reflecting surfaces 420 capable of reflecting ray radiation, wherein each inner reflecting surface 420 is served as the boundary of two neighboring light conduits 402. In the present embodiment, each light conduit 402 has a light input side 402A and a light output side 402B and each inner reflecting surface 420 can include an adjusting device 422 close to the light input side 402A. The adjusting device 422 is used for adjusting a light incident area of each light conduit 402 between two closely adjacent light conduits 402 at the light input side 402A.

The adjusting device 422 of each inner reflecting surface 420 can be formed by a light guide plate capable of adjusting the disposition angle and be disposed close to the light input side 402A. When the disposition angle of the adjusting device 422 is adjusted, one of the light incident areas of the corresponding two light conduits 402 can be increased while the other is reduced. By applying the light conduit array 400 to the solar simulators 100 to 300 of the first to the third embodiments, the distribution of the ray radiation can be further tuned to optimize the uniformity of irradiance. In addition, each inner reflecting surface 420 can be selectively include another adjusting device (not shown) close to the light output side 402B to adjusting the size of the light emitting surface of the corresponding light conduit 402 for obtaining the simulated solar light having the required uniformity of irradiance.

In the present embodiment, the light conduit array 400 further optionally includes at least one adjusting light guide plate 430 disposed inside one of the light conduits 402 so as to divide a light emitting surface of the corresponding light conduit 402 into a plurality of light emitting areas 432. Herein, the height of the adjusting light guide plate 430 can exemplarily be smaller than that of the inner reflecting surfaces P, which is, however, not limited in the present disclosure. It is noted that at leas one of the adjusting devices and the adjusting light guide plate 430 can be optionally applied in any one of the solar simulators 100~300 of the first to the third embodiments to accomplish the uniformity of irradiance of the simulated solar light.

By the configuration of the adjusting light guide plate 430, the light conduit 400 can scatter the ray radiation transmitted in one light conduit 402 into a plurality of light emitting areas 432. For example, when the adjusting light guide plate 430 is applied to the solar simulator 300 of the third embodiment, the ray radiation L of each light source 310 originally parceled to four exposure regions can be further parceled to 16 exposure regions, which is conducive the enhance the uniformity of irradiance on the test plane of the simulated solar light. Accordingly, the ray radiation transmitted in each light conduit 402 can be further evened to have the better uniformity of irradiance on the test plane. The included angles between the adjusting light guide plates 430 or the included angles between the adjusting light guide plate 430 and the inner reflecting surface 420 can be determined and adjusted according to the requirement, and thus the largest included angle between two adjusting light guide plates 430 can be 90 degree or different to 90 degree.

Figure 5:
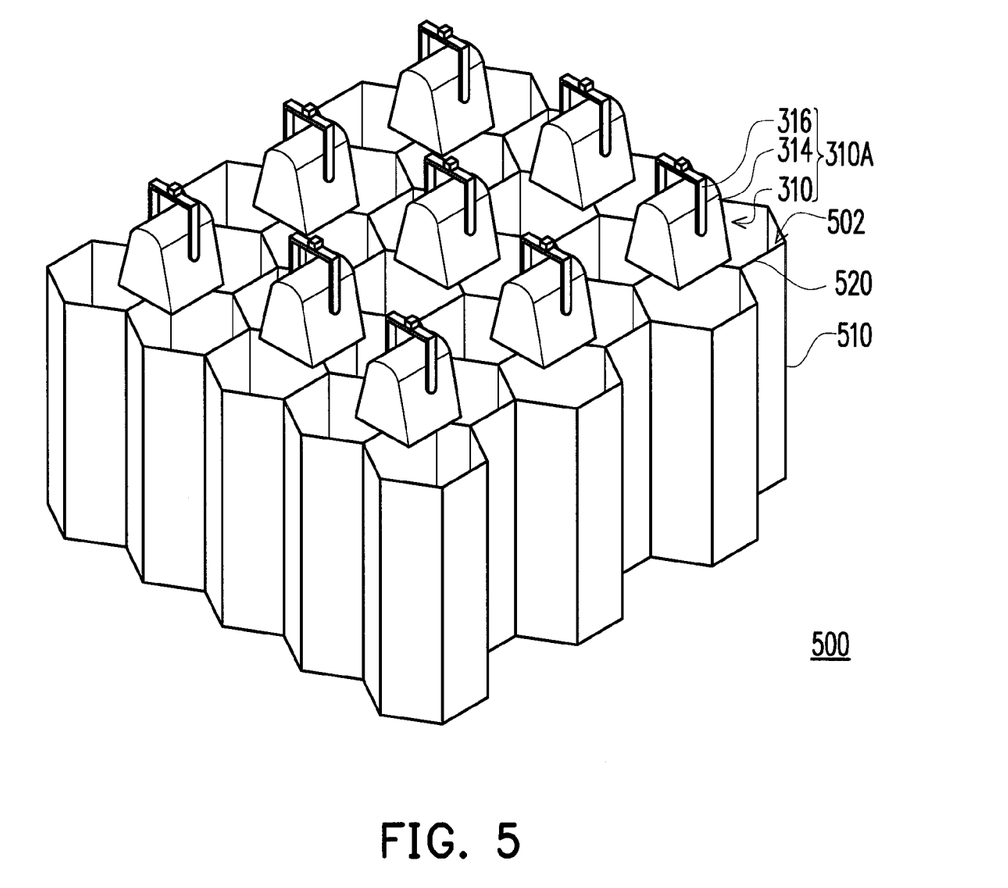
FIG. 5 is a schematic view of a light conduit array of the solar simulator according to another embodiment of the present disclosure.

FIG. 5 is a schematic view of a light conduit array of the solar simulator according to another embodiment of the present disclosure. Referring to FIG. 5, the light conduit array 500 can include a plurality of light conduits 502 which construct the stereo frame structure M and each of the light conduits 502 has a plurality of inner reflecting surfaces P capable of reflecting the ray radiation. The difference between this embodiment and the previous embodiment lies in that each light conduit 502 in the light conduit array 500 has the shape of hexagonal column. The light conduit array 500 can be applied to at least one of the abovementioned first to third embodiments for replacing the light conduit array 120, 220, or 320. Herein, the light source 310 can be disposed between two neighboring light conduits 502 or among three closely adjacent light conduits 502 as shown in FIG. 5. Alternately, a plurality of the light sources 310 can be configured corresponding to one of the light conduits 502, and the disclosure is not particularly limited thereto. Certainly, the aforesaid light conduits 502 respectively having the shape of the hexagonal column are merely exemplary and should not be construed as limitations to the present disclosure. However, in other embodiments, the light conduits 502 can be in the shape of an octagonal column, a polygonal column having ten sidewalls, or the like.

In light of the foregoing, the light conduit array consisting of a plurality of light conduits are configured in front of the light source according to the present disclosure, which makes the ray radiation emitted the light source uniform distribution through the effect of the light conduits. Accordingly, the solar simulator can achieved the better uniformity of irradiance on the test plane. Moreover, the relative positions of the light source and the light conduit array can be adjusted according to the required light emitting effect of the light source and the needed uniformity of irradiance through the adjusters configured in the light conduit, so that the needed uniformity of irradiance on the test plane can be easily achieved according to the structure provided in the disclosure.

Although the invention has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A solar simulator, comprising:
a light source used for emitting a beam of ray radiation; and
a light conduit array comprising a plurality of light conduits, the light conduits being closely adjacent to one another and configured in a light path of the ray radiation, each of the light conduits having inner reflecting surfaces to reflect the ray radiation, a light input side, and a light output side opposite to the light input side, and the ray radiation entering the light conduits through the light input side and emitting from the light output side wherein shapes of the light conduits are respectively a polygonal column.

2. The solar simulator of claim 1, wherein the light source comprises a reflector to collect the ray radiation to the light path.

3. The solar simulator of claim 1, wherein the light source comprises an alignment device for adjusting the position of the light source.

4. The solar simulator of claim 1, wherein the inner reflecting surface of each of the light conduits comprises an adjusting device adjacent to the light input side and the adjusting device is used for adjusting the light incident area of each light conduit between two neighboring light conduits at the light input side.

5. The solar simulator of claim 1, further comprising at least one adjusting light guide plate disposed inside one of the light conduits so as to divide a light emitting surface of the corresponding light conduit into a plurality of light emitting areas.

6. The solar simulator of claim 1, wherein a portion of the ray radiation is allowed to directly pass through a hollow space of a corresponding light conduit.

7. A solar simulator, comprising:
a light source array comprising a plurality of light sources and each of the light sources being used for emitting a beam of ray radiation; and
a light conduit array comprising a plurality of light conduits, the light conduits being closely adjacent to one another and configured in a light path of the ray radiation, wherein the light sources being disposed outside the light conduits, each of the light conduits having inner reflecting surfaces to reflect the ray radiation emitted from the plurality of the light sources, a light input side, and a light output side opposite to the light input side, and the ray radiation entering the light conduits through the light input side and emitting from the light output side, and a transmission medium of the ray radiation in each of the light conduits is air.

8. The solar simulator of claim 7, wherein each of the light sources corresponds to one of the light conduits.

9. The solar simulator of claim 7, wherein each of the light sources corresponds to a plurality of the light conduits.

10. The solar simulator of claim 7, wherein a plurality of the light sources corresponds to one of the light conduits.

11. The solar simulator of claim 7, wherein shapes of the light conduits are respectively a polygonal column.

12. The solar simulator of claim 7, wherein the inner reflecting surface of each of the light conduits comprises an adjusting device adjacent to the light input side and the adjusting device is used for adjusting a light incident area of each light conduit between two neighboring light conduits at the light input side.

13. The solar simulator of claim 7, further comprising at least one adjusting light guide plate disposed inside one of the light conduits so as to divide a light emitting surface of the corresponding light conduit into a plurality of light emitting areas.

14. The solar simulator of claim 7, wherein each of the light sources comprises a reflector to collect the ray radiation to the light path.

15. The solar simulator of claim 7, wherein each of the light sources comprises an alignment device for adjusting the position of the light source.

* * * * *